United States Patent
Hirose et al.

(10) Patent No.: US 11,305,257 B2
(45) Date of Patent: Apr. 19, 2022

(54) HONEYCOMB STRUCTURE

(71) Applicant: NGK Insulators, Ltd., Nagoya (JP)

(72) Inventors: Shogo Hirose, Nagoya (JP); Hirotaka Yamamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/172,526

(22) Filed: Feb. 10, 2021

(65) Prior Publication Data

US 2021/0291146 A1    Sep. 23, 2021

(30) Foreign Application Priority Data

Mar. 18, 2020    (JP) .............................. JP2020-047719

(51) Int. Cl.
  *B01J 20/28*    (2006.01)
  *B01J 20/16*    (2006.01)
  (Continued)

(52) U.S. Cl.
  CPC .... *B01J 20/28045* (2013.01); *B01D 39/2068* (2013.01); *B01D 46/2429* (2013.01); *B01D 53/9418* (2013.01); *B01D 53/9477* (2013.01); *B01J 20/16* (2013.01); *B01J 20/28011* (2013.01); *B01J 20/28085* (2013.01); *B01J 29/06* (2013.01); *B01J 35/04* (2013.01); *F01N 3/0222* (2013.01); *F01N 3/2803* (2013.01); *B01D 46/2498* (2021.08); *B01D 46/24491* (2021.08); *B01D 46/24492* (2021.08);
  (Continued)

(58) Field of Classification Search
  CPC ........... B01J 20/28046; B01D 39/2068; B01D 46/2429; B01D 46/24491; B01D 46/2498; F01N 3/2022

USPC .................................................. 422/177, 180
See application file for complete search history.

(56) References Cited

U.S. PATENT DOCUMENTS

| 2013/0059724 | A1 | 3/2013 | Hirose et al. |
| 2014/0154145 | A1* | 6/2014 | Aoki ................. B01J 35/0006 422/180 |

(Continued)

FOREIGN PATENT DOCUMENTS

| EP | 1040871 A2 * | 10/2000 | ......... C04B 38/0006 |
| JP | 2013-052367 A1 | 3/2013 | |

*Primary Examiner* — Tom P Duong
(74) *Attorney, Agent, or Firm* — Burr & Brown, PLLC

(57) ABSTRACT

A honeycomb structure comprising a pillar-shaped honeycomb structure body having a porous partition wall disposed so as to surround a plurality of cells, wherein
  let that A denotes an absolute value of open frontal area (%) in a plane of the honeycomb structure body orthogonal to the extending direction of the cells and P denotes an absolute value of porosity (%) of the partition wall, the honeycomb structure has a value represented by the following expression (1) that is 0.05 to 0.12,
  let that D denotes an average pore diameter (m) of the partition wall and G denotes a geometric surface area (mm²/mm³) of the partition wall, the honeycomb structure has a value represented by the following expression (2) that is 8 to 50 (μm×mm²/mm³), and
  the honeycomb structure has a hydraulic diameter of the cells that is 1.1 mm or more, $(1-A/100) \times (1-P/100)$,    Expression (1)

$D \times G$.    Expression (2)

5 Claims, 3 Drawing Sheets

(51) Int. Cl.
  *B01J 29/06* (2006.01)
  *B01D 46/24* (2006.01)
  *B01D 39/20* (2006.01)
  *B01D 53/94* (2006.01)
  *F01N 3/28* (2006.01)
  *F01N 3/022* (2006.01)
  *B01J 35/04* (2006.01)

(52) U.S. Cl.
  CPC .. *B01D 2255/50* (2013.01); *B01D 2255/9155* (2013.01); *B01D 2279/30* (2013.01); *F01N 2330/02* (2013.01); *F01N 2370/04* (2013.01)

(56) References Cited

U.S. PATENT DOCUMENTS

| | | | |
|---|---|---|---|
| 2016/0067653 A1* | 3/2016 | Miyairi | B01J 37/0234 422/180 |
| 2016/0069308 A1* | 3/2016 | Miyairi | B01D 46/2474 55/529 |
| 2017/0128874 A1* | 5/2017 | Hamazaki | B01D 46/247 |
| 2017/0232377 A1* | 8/2017 | Ogata | B01D 46/2429 428/118 |
| 2017/0326539 A1* | 11/2017 | Aoki | C04B 35/195 |
| 2018/0104635 A1* | 4/2018 | Miyairi | B01D 46/247 |
| 2018/0104636 A1* | 4/2018 | Miyairi | B01D 46/2429 |

* cited by examiner

HONEYCOMB STRUCTURE

BACKGROUND OF THE INVENTION

Field of the Invention

The present invention relates to honeycomb structures. More specifically the present invention relates to a honeycomb structure having excellent temperature-rising property and capable of effectively suppressing the peeling-off of catalyst that is loaded for purifying exhaust gas.

Description of the Related Art

Currently, developed countries are examining to tighten the regulations on NOx emission from diesel-fueled vehicles and tracks more. To meet such NOx regulations, various techniques have been proposed to treat NOx in exhaust gas. One of these techniques, for example, manufactures a honeycomb structure having a porous partition wall loaded with selective catalytic reduction catalyst (hereinafter this may be called "SCR catalyst") and the like, and treats NOx in exhaust gas with the honeycomb structure for purification (see Patent Document 1). "SCR" stands for selective catalytic reduction.

Conventionally the most prevalent system to purify exhaust gas has been configured to include a first honeycomb catalyst carrier loaded with oxidation catalyst, a honeycomb filter, and a second honeycomb catalyst carrier loaded with SCR catalyst that are sequentially disposed from the upstream to the downstream of the exhaust system. To meet strict NOx emission regulations as described above, another system to purify exhaust gas is currently under study, which additionally includes a third honeycomb catalyst carrier loaded with SCR catalyst upstream of the first honeycomb catalyst carrier loaded with oxidation catalyst in the exhaust system. The third honeycomb catalyst carrier aims to improve the purifying performance of the exhaust gas at low temperatures.

[Patent Document 1] JP-A-2013-052367

SUMMARY OF THE INVENTION

For the above-described system including an additional third honeycomb catalyst carrier loaded with SCR catalyst upstream in the exhaust system, the amount of SCR catalyst loaded at the third honeycomb catalyst carrier has to increase. Specifically the amount of SCR catalyst loaded at the third honeycomb catalyst carrier may be more than the amount of the SCR catalyst at the second honeycomb catalyst carrier placed downstream in the exhaust system. This effectively improves the purifying performance of exhaust gas at low temperatures.

A conventional honeycomb structure for catalyst carrier including such a large amount of SCR catalyst loaded at the third honeycomb catalyst carrier, however, fails to keep a sufficient surface area of the partition wall to apply the SCR catalyst, and so causes peeling-off of the loaded catalyst in actual use. In particular, when the number of cells in the honeycomb structure is small and so the through channel per cell is large, the surface area of the partition wall to apply the catalyst is small. This case noticeably causes the peeling-off of the loaded catalyst. Hereinafter, the peeling-off of the loaded catalyst at the honeycomb structure may be called "catalyst peeling".

In one example, a conventional honeycomb structure used as a catalyst carrier for SCR catalyst has a cell density defined by the partition wall that is about 100 cells/cm$^2$. The second honeycomb catalyst carrier in the above-described example is placed downstream of the honeycomb filter, and a honeycomb structure used as this catalyst carrier has a relatively high cell density because the honeycomb filter removes particulate matter such as soot in exhaust gas. If such a honeycomb structure is used as the third honeycomb catalyst carrier that is placed upstream in the exhaust system, the cells of the honeycomb structure will be clogged with particulate matter, and the cells will be blocked in a relatively short period of time.

In view of such problems of the conventional techniques, the present invention provides a honeycomb structure having excellent temperature-rising property and capable of effectively suppressing the peeling-off of catalyst that is loaded for purifying exhaust gas.

The present invention provides the following honeycomb structure.

[1] A honeycomb structure including a pillar-shaped honeycomb structure body having a first end face and a second end face and including a porous partition wall disposed so as to surround a plurality of cells, the plurality of cells extending from the first end face to the second end face and serving as a through channel of fluid, wherein let that A denotes an absolute value of open frontal area (%) in a plane of the honeycomb structure body orthogonal to the extending direction of the cells and P denotes an absolute value of porosity (%) of the partition wall, the honeycomb structure has a value represented by the following expression (1) that is 0.05 to 0.12, let that D denotes an average pore diameter (μm) of the partition wall and G denotes a geometric surface area (mm$^2$/mm$^3$) of the partition wall, the honeycomb structure has a value represented by the following expression (2) that is 8 to 50 (μm×mm$^2$/mm$^3$), and the honeycomb structure has a hydraulic diameter of the cells that is 1.1 mm or more, $$(1-A/100)\times(1-P/100), \quad \text{Expression (1)}$$

$$D\times G. \quad \text{Expression (2)}$$

[2] The honeycomb structure according to [1], wherein the partition wall includes at least one type selected from the group consisting of cordierite, silicon carbide, silicon nitride, and mullite.

[3] The honeycomb structure according to [1] or [2], wherein the partition wall has a surface roughness Ra of 1 μm or more.

[4] The honeycomb structure according to any one of [1] to [3], wherein the honeycomb structure is installed in an exhaust system of an internal combustion engine, and is placed upstream of an oxidation catalyst or an exhaust-gas purifying filter installed separately in the exhaust system.

The honeycomb structure of the present invention has the remarkable advantageous effects of having excellent temperature-rising property and of effectively suppressing the peeling-off of loaded catalyst for purifying exhaust gas. The honeycomb structure of the present invention is less likely to have clogging in the cells with particulate matter in the exhaust gas even when it is placed relatively upstream in the exhaust system, and so effectively prevents the clogging of the cells. The honeycomb structure of the present invention also has an excellent mechanical strength. For example, when a honeycomb structure is used as a catalyst carrier to purify exhaust gas, the honeycomb structure may be stored in a casing such as a metal case. Storing a honeycomb structure in a casing, such as a metal case, may be called canning. The canning of a honeycomb structure applies a plane pressure to the outer circumferential surface of the honeycomb structure via a holding member, such as a mat, to place the honeycomb structure into the casing for holding. The honeycomb structure of the present invention effectively suppresses a breakage due to compressing plane pressure applied to the outer circumferential surface during this canning.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

Figure 1:
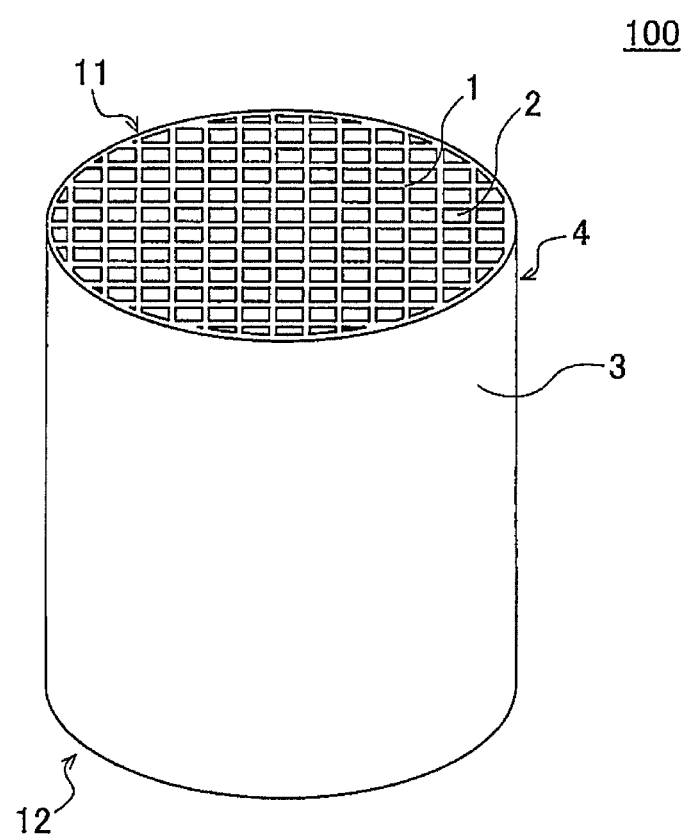
FIG. 1 is a perspective view schematically showing a first embodiment of the honeycomb structure of the present invention.
Figure 2:
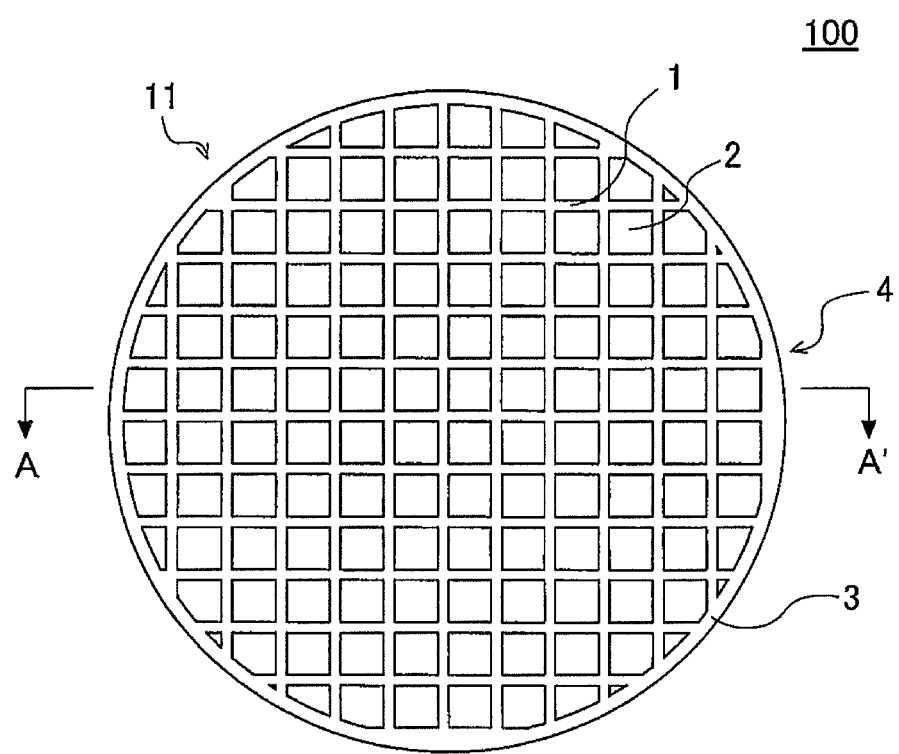
FIG. 2 is a plan view showing a first end face side of the honeycomb structure of FIG. 1.
Figure 3:
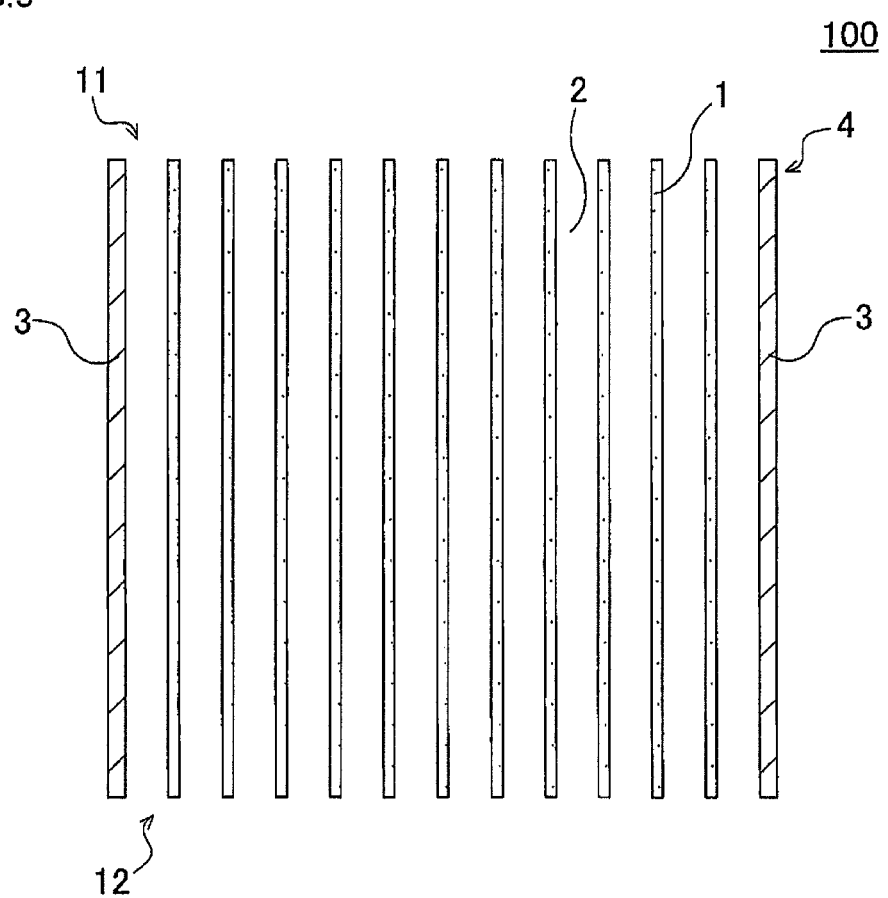
FIG. 3 is a schematic cross-sectional view taken along A-A' of FIG. 2.

(1) Honeycomb Structure:

A first embodiment of the honeycomb structure of the present invention is a honeycomb structure 100 as shown in FIGS. 1 to 3. FIG. 1 is a perspective view schematically showing the first embodiment of the honeycomb structure of the present invention. FIG. 2 is a plan view showing a first end face side of the honeycomb structure of FIG. 1. FIG. 3 is a schematic cross-sectional view taken along the line A-A' of FIG. 2.

As shown in FIGS. 1 to 3, the honeycomb structure 100 includes a pillar-shaped honeycomb structure body 4 having a first end face 11 and a second end face 12. The honeycomb structure body 4 has a porous partition wall 1 that surrounds a plurality of cells 2, and the plurality of cells 2 extends from the first end face 11 to the second end face 12 and serves as a through channel of fluid. In the honeycomb structure 100, the honeycomb structure body 4 has a round pillar shape, and further includes a circumferential wall 3 at the outer circumferential face. That is, the circumferential wall 3 surrounds the grid-patterned partition wall 1.

Let that A denotes the absolute value of the open frontal area (%) of the honeycomb structure body 4 and P denotes the absolute value of the porosity (%) of the partition wall 1, the honeycomb structure 100 has the value represented by the following expression (1) that is 0.05 to 0.12.

$$(1-A/100) \times (1-P/100) \quad \text{Expression (1)}$$

The open frontal area (%) of the honeycomb structure body 4 is the open frontal area (%) in a plane of the honeycomb structure body 4 orthogonal to the extending direction of the cells 2. Specifically the open frontal area (%) of the honeycomb structure body 4 can be obtained as the percentage of the ratio of the area S2 of voids of the cells 2 to the overall area S1 of the plane of the honeycomb structure body 4 orthogonal to the extending direction of the cells 2. For example, the open frontal area (%) of the honeycomb structure body 4 can be measured with an optical microscope.

The porosity (%) of the partition wall 1 is a value measured by mercury intrusion porosimetry. The porosity of the partition wall 1 can be measured using Autopore 9500 (product name) produced by Micromeritics Co, for example. To measure the porosity, a part of the partition wall 1 may be cut out from the honeycomb structure 100 to prepare a test piece for the measurement.

The value represented by the above expression (1) of 0.05 to 0.12 allows the honeycomb structure to have excellent temperature-rising property and be capable of effectively suppressing the peeling-off of catalyst that is loaded for purifying exhaust gas. The value represented by the above expression (1) is preferably 0.07 to 0.10, more preferably 0.08 to 0.09.

The open frontal area (%) of the honeycomb structure body 4 is preferably 80 to 90%, more preferably 81 to 89%, and particularly preferably 82 to 88%. The open frontal area (%) of the honeycomb structure body 4 less than 80% is not favorable from the viewpoint of temperature-rising property and soot clogging. The open frontal area (%) of the honeycomb structure body 4 exceeding 90% is not favorable because the isostatic strength decreases, and so the honeycomb structure easily breaks during canning.

The porosity (%) of the partition wall 1 is preferably 25 to 60%, more preferably 27 to 55%, and particularly preferably 30 to 45%. The porosity (%) of the partition wall 1 less than 25% is not favorable from the viewpoint of catalyst peeling. The porosity (%) of the partition wall 1 exceeding 60% is not favorable because the isostatic strength decreases, and so the honeycomb structure easily breaks during canning.

Let that D denotes the average pore diameter (μm) of the partition wall 1 and G denotes the geometric surface area (mm$^2$/mm$^3$) of the partition wall 1, the honeycomb structure 100 has the value represented by the following expression (2) that is 8 to 50 (μm×mm$^2$/mm$^3$).

$$D \times G \quad \text{Expression (2)}$$

The average pore diameter (μm) of the partition wall 1 is a value measured by mercury intrusion porosimetry. Similarly to the measurement of the porosity, the average pore diameter of the partition wall 1 can be measured using Autopore 9500 (product name) produced by Micromeritics Co, for example.

The geometric surface area (mm$^2$/mm$^3$) of the partition wall 1 is a value measured with an optical microscope. In one example to measure the geometric surface area of the partition wall 1, the length of the surface of the partition wall 1 defining the cells 2 is measured first with an optical microscope. Then, the area per unit volume of the partition wall 1 is measured. Based on these results, the geometric surface area (mm$^2$/mm$^3$) of the partition wall 1 can be obtained. The "length of the surface of the partition wall 1" means the perimeter of a cell 2 when the cell 2 is observed from the end face side of the honeycomb structure 100.

The value represented by the above expression (2) of 8 to 50 (μm×mm$^2$/mm$^3$) effectively suppresses the peeling-off of catalyst, and also effectively suppresses a breakage due to compressing plane pressure applied to the outer circumferential face of the honeycomb structure 100 during the canning. The value represented by the above expression (2) is preferably 10 to 40 (μm×mm$^2$/mm$^3$), more preferably 20 to 30 (μm×mm$^2$/mm$^3$).

The average pore diameter (μm) of the partition wall 1 preferably is 1 to 20 μm, more preferably 3 to 15 μm, and particularly preferably 4 to 13 μm. The average pore diameter (μm) of the partition wall 1 less than 1 μm is not favorable from the viewpoint of catalyst peeling. For example, the amount of catalyst penetrating inside of the partition wall 1 is small, so that the adhesion area between the catalyst layer formed with the catalyst and the partition wall 1 is small, and so the catalyst may easily peel off. The average pore diameter (μm) of the partition wall 1 exceeding 20 μm is not favorable from the viewpoint of the purifying performance. For example, significant amount of the catalyst penetrates inside of the partition wall 1, and the amount of the catalyst on the surface of the partition wall 1 that contributes to purifying reduces, so that the purifying performance may decrease.

The geometric surface area ($mm^2/mm^3$) of the partition wall 1 is preferably 1 to 4 $mm^2/mm^3$, more preferably 1.5 to 3.5 $mm^2/mm^3$, and particularly preferably 2 to 3 $mm^2/mm^3$. The geometric surface area ($mm^2/mm^3$) of the partition wall 1 less than 1 $mm^2/mm^3$ is not favorable from the viewpoint of temperature-rising property. The geometric surface area ($mm^2/mm^3$) of the partition wall 1 exceeding 4 $mm^2/mm^3$ is not favorable from the viewpoint of soot clogging. For example, this leads to the difficulty to increase the diameter of open ends of the cells 2, and so the cells 2 may be easily clogged with soot.

The honeycomb structure 100 has a hydraulic diameter of the cells 2 surrounded by the partition wall 1 that is 1.1 mm or more. The "hydraulic diameter of the cells 2" is a value calculated based on the cross-sectional area and the perimeter of each cell 2 by 4×(cross-sectional area)/(perimeter). The hydraulic diameter of the cells 2 is preferably 1.1 to 1.7 mm, more preferably 1.2 to 1.6 mm, and particularly preferably 1.3 to 1.5 mm. The hydraulic diameter of the cells 2 less than 1.1 mm causes the tendency of clogging the cells 2 with the particulate matter such as soot in exhaust gas.

The partition wall 1 preferably has a surface roughness Ra of 1 μm or more, more preferably 1 to 4 μm, and particularly preferably 1.5 to 3.5 pin. The surface roughness Ra of the partition wall 1 less than 1 μm is not favorable from the viewpoint of holding the honeycomb structure during canning. That is, the partition wall 1 and the circumferential wall 3 of the honeycomb structure 100 will have a substantially same surface roughness because of the manufacturing process, and so the surface roughness of the circumferential wall 3 will be small. In this case, it may be difficult to hold the honeycomb structure 100 stably during canning. The surface roughness Ra of the partition wall 1 can be a value measured by the method described in JIS B0633: 2001 using a three-dimensional measuring instrument.

The honeycomb structure 100 preferably has a thickness of the partition wall 1 that is 0.06 to 0.21 mm, and 0.07 to 0.15 mm more preferably. The thickness of the partition wall 1 can be measured with a scanning electron microscope or a microscope, for example. The thickness of the partition wall 1 less than 0.06 mm may cause an insufficient strength. The thickness of the partition wall 1 exceeding 0.21 min may cause an increase in pressure loss.

The shape of the cells 2 in the honeycomb structure body 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, and an octagon. For the shape of the cells 2, all of the cells 2 may have the same shape, or the cells 2 may have different shapes. For instance, although not shown, quadrangular cells and octagonal cells may be combined. For the size of the cells 2, all the cells 2 may have the same size, or the cells 2 may have different sizes. For instance, although not shown, some of the plurality of cells may be larger, and other cells may be smaller relatively. In the present invention, the cells 2 refer to a space surrounded with the partition wall 1.

Preferably the cells 2 defined by the partition wall 1 have a cell density that is 30 to 70 $cells/cm^2$, more preferably 35 to 65 $cells/cm^2$, and particularly preferably 40 to 50 $cells/cm^2$. The honeycomb structure 100 of the present embodiment with this configuration can be favorably used as a member for purification (e.g., a catalyst carrier) to purify exhaust gas emitted from an automobile engine.

The circumferential wall 3 of the honeycomb structure body 4 may be monolithic with the partition wall 1 or may be a circumference coating layer that is formed by applying a circumference coating material so as to surround the partition wall 1. Although not shown, during the manufacturing process, the partition wall and the circumferential wall may be formed in a monolithic manner, and then the circumferential wall formed may be removed by a known method, such as grinding. Then, the circumference coating layer may be disposed on the circumference of the partition wall.

The shape of the honeycomb structure body 4 is not limited especially. Examples of the shape of the honeycomb structure body 4 include a pillar shape in which the first end face 11 and the second end face 12 have a shape, such as a circle, an ellipse, or a polygon.

The dimensions of the honeycomb structure body 4, including the length from the first end face 11 to the second end face 12 and the size of a cross section orthogonal to the extending direction of the cells 2 of the honeycomb structure body 4, are not limited especially. The dimensions of the honeycomb structure body 4 may be selected appropriately so that the honeycomb structure 100 of the present embodiment can have the optimum ability for purification when it is used as a member to purify exhaust gas. For instance, the length from the first end face 11 to the second end face 12 of the honeycomb structure body 4 is preferably 72 to 254 mm, and more preferably 102 to 203 mm. The area of a cross section orthogonal to the extending direction of the cells 2 of the honeycomb structure body 4 is preferably 1900 to 130000 $mm^2$, and more preferably 5000 to 100000 $mm^2$.

Preferably the partition wall 1 is made of at least one type of materials selected from the group consisting of cordierite, silicon carbide, silicon nitride, and mullite. The partition wall 1 preferably include these materials accounting for 20 mass % or more, more preferably 30 mass % or more, and particularly preferably 50 mass % or more.

In the honeycomb structure 100, the partition wall 1 defining the plurality of cells 2 may be loaded with catalyst to purify exhaust gas. The partition wall 1 being loaded with catalyst refers to loading of the catalyst on the surface of the partition wall 1 or in the pores formed in the partition wall 1. In particular, the honeycomb structure 100 enables an increased amount of catalyst loaded in the pores of the partition wall 1, and so can suppress an increase of pressure loss after loading with the catalyst to purify exhaust gas.

The loading amount of the catalyst at the partition wall 1 of the honeycomb structure body 4 per unit volume may be determined appropriately depending on the type of the catalyst used. As a loading method of the catalyst, catalyst slurry containing a catalyst component may be wash-coated on the honeycomb structure body 4, followed by heat treatment at high temperatures for burning, for example. Examples of the catalyst for purifying exhaust gas include an SCR catalyst.

The honeycomb structure 100 can be favorably used for a catalyst carrier to be loaded with catalyst to purify exhaust gas, such as SCR catalyst as stated above. The honeycomb structure 100 loaded with the catalyst is installed in the exhaust system of an internal combustion engine for use. In use, the honeycomb structure 100 loaded with the catalyst may be favorably placed upstream of an oxidation catalyst (not shown) or an exhaust-gas purifying filter (not shown) installed separately in the exhaust system.

(2) Method for Manufacturing Honeycomb Structure:

There is no particular limitation on the method for manufacturing the honeycomb structure of the present invention, and the honeycomb structure can be manufactured by the following method, for example. Firstly a kneaded material having plasticity is prepared to produce a honeycomb structure body. The kneaded material to produce a honeycomb structure body can be prepared by adding additives, such as binder, pore former and water as needed to a material selected as raw material powder from the aforementioned materials suitable for the honeycomb structure body. Examples of the binder include methylcellulose and hydroxypropyl methylcellulose. Examples of the additives include surfactant. The porosity and the average pore diameter of the partition wall can be controlled by adjusting the particle diameter and additive amount of the pore former.

Next the prepared kneaded material in this way is extruded, thereby producing a pillar-shaped honeycomb formed body having a partition wall defining a plurality of cells and a circumferential wall surrounding this partition wall. For the extrusion of the honeycomb formed body, the open frontal area (%) of the honeycomb formed body is preferably adjusted to a desired value with a die for extrusion.

Next, the obtained honeycomb formed body is dried by microwaves and hot air, for example. Next the honeycomb formed body is fired to manufacture a honeycomb structure. Temperatures and atmosphere for the firing differ according to the raw material, and those skilled in the art can select the temperature and atmosphere for the firing that are the most suitable for the selected material.

EXAMPLES

The following describes the present invention more specifically by way of examples, and the present invention is by no means limited to these examples.

Example 1

10 parts by mass of pore former, 4 parts by mass of dispersing medium, and 4 parts by mass of organic binder were added to 100 parts by mass of the cordierite forming raw material, followed by mixing and kneading to prepare a kneaded material. As the cordierite forming raw material, alumina, aluminum hydroxide, kaolin, talc, and silica were used. As the dispersing medium, water was used. As the organic binder, methylcellulose was used. As the dispersing agent, dextrin was used. As the pore former, water absorptive polymer having the average particle diameter of 5 μm was used.

Next, the kneaded material was extruded using a die for manufacturing of a honeycomb formed body to obtain a honeycomb formed body having a round pillar shape as the overall shape. The cells of the honeycomb formed body had a quadrangular shape.

Next, the honeycomb formed body was dried by a microwave dryer, then was dried completely by a hot-air drier, and then both end faces of the honeycomb formed body were cut so as to have predetermined dimensions. Next the dried honeycomb formed body was degreased and fired, so as to obtain a honeycomb structure of Example 1.

The honeycomb structure of Example 1 had a round pillar shape, where the first end face and the second end face were round. The first end face and the second end face had the diameter of 190.5 mm. The honeycomb structure had the length in the cell extending direction of 101.6 mm. The honeycomb structure of Example 1 had the thickness of the partition wall of 0.114 mm, the cell density of 62.0 cells/cm', and the cell pitch of 1.27 mm. The open frontal area A of the honeycomb structure was 82.8%. The hydraulic diameter of the cells was 1.16 mm. Table 1 shows the results.

TABLE 1

|  | Partition wall thickness mm | Cell density cells/cm² | Cell pitch mm | Porosity P % | Open frontal area A % | Value of Expression (1)(*1) — | Hydraulic diameter mm | Geometric surface area G mm²/mm³ | Average pore diameter D μm | Value of Expression (2)(*2) μm xmm²/mm³ | Surface roughness Ra μm |
|---|---|---|---|---|---|---|---|---|---|---|---|
| Ex. 1 | 0.114 | 62.0 | 1.27 | 45 | 82.8 | 0.09 | 1.16 | 2.87 | 6 | 17 | 2.1 |
| Ex. 2 | 0.089 | 62.0 | 1.27 | 30 | 86.5 | 0.09 | 1.18 | 2.93 | 4 | 12 | 1.8 |
| Ex. 3 | 0.132 | 46.5 | 1.47 | 50 | 82.8 | 0.09 | 1.33 | 2.48 | 20 | 50 | 1.7 |
| Ex. 4 | 0.140 | 31.0 | 1.80 | 30 | 85.0 | 0.10 | 1.66 | 2.05 | 4 | 8 | 2.2 |
| Ex. 5 | 0.089 | 46.5 | 1.47 | 30 | 88.2 | 0.08 | 1.38 | 2.56 | 4 | 10 | 2.0 |
| Ex. 6 | 0.114 | 62.0 | 1.27 | 50 | 82.8 | 0.09 | 1.16 | 2.87 | 13 | 37 | 2.0 |
| Ex. 7 | 0.132 | 46.5 | 1.47 | 35 | 82.8 | 0.11 | 1.33 | 2.48 | 4 | 10 | 2.3 |
| Ex. 8 | 0.114 | 62.0 | 1.27 | 35 | 82.8 | 0.11 | 1.16 | 2.87 | 4 | 11 | 3.0 |
| Ex. 9 | 0.114 | 46.5 | 1.47 | 35 | 85.0 | 0.10 | 1.35 | 2.52 | 4 | 10 | 2.6 |
| Ex. 10 | 0.114 | 62.0 | 1.27 | 30 | 82.8 | 0.12 | 1.16 | 2.87 | 13 | 37 | 2.4 |
| Ex. 11 | 0.089 | 69.8 | 1.20 | 30 | 85.7 | 0.10 | 1.11 | 3.09 | 13 | 40 | 2.2 |
| Comp. Ex. 1 | 0.175 | 62.0 | 1.27 | 50 | 74.3 | 0.13 | 1.09 | 2.71 | 4 | 11 | 2.1 |
| Comp. Ex. 2 | 0.064 | 93.0 | 1.04 | 28 | 88.1 | 0.09 | 0.97 | 3.62 | 4 | 14 | 2.3 |
| Comp. Ex. 3 | 0.089 | 93.0 | 1.04 | 50 | 83.6 | 0.08 | 0.95 | 3.53 | 11 | 39 | 2.5 |
| Comp. Ex. 4 | 0.132 | 46.5 | 1.47 | 35 | 82.8 | 0.11 | 1.33 | 2.48 | 3 | 7 | 2.4 |
| Comp. Ex. 5 | 0.089 | 93.0 | 1.04 | 50 | 83.6 | 0.08 | 0.95 | 3.53 | 20 | 71 | 2.6 |
| Comp. Ex. 6 | 0.089 | 77.5 | 1.14 | 51 | 85.0 | 0.07 | 1.05 | 3.25 | 18 | 58 | 2.0 |
| Comp. Ex. 7 | 0.114 | 62.0 | 1.27 | 50 | 82.8 | 0.09 | 1.16 | 2.87 | 20 | 57 | 1.8 |

(*1)Expression (1): (1-A/100) × (1-P/100)

(*2)Expression (2): D × G

For the honeycomb structure of Example 1, the "porosity P (%)", "geometric surface area G (mm²/mm³)", "average pore diameter D (μm)" and "surface roughness Ra (μm)" were measured by the following method. Table 1 shows the result.

[Porosity P (%)]

Porosity of the partition wall was measured using Autopore 9500 (product name) produced by Micromeritics Co. To measure the porosity, a part of the partition wall was cut out from the honeycomb structure to prepare a test piece, and the porosity of the obtained test piece was measured. The test piece was a cuboid of about 10 mm, about 10 mm and about 10 mm in width, height and depth, respectively. The test piece was cut out from a part close to the center in the axial direction of the honeycomb structure.

[Geometric Surface Area G (Mm²/Mm³)]

Geometric surface area was measured with an optical microscope.

[Average Pore Diameter D (μm)]

Average pore diameter of the partition wall was measured using Autopore 9500 (product name) produced by Micromeritics Co. The average pore diameter was measured using the same test piece as in the measurement of the porosity.

[Surface Roughness Ra (μm)]

Surface roughness was measured using a three-dimensional measuring instrument.

For the honeycomb structure of Example 1, the porosity P was 45%, the geometric surface area G was 2.87 mm²/mm³, the average pore diameter D was 6 μm, and the surface roughness Ra was 2.1 μm. Based on these obtained values, the values of "Expression (1): $(1-A/100)\times(1-P/100)$" and "Expression (2): $D\times G$" were calculated. Table 1 shows the result.

Catalyst was loaded on the partition wall of the honeycomb structure of Example 1 by the following method. Firstly catalyst slurry containing zeolite as catalyst was prepared. This catalyst slurry was loaded on the honeycomb structure so that the loading amount per unit volume after drying was 150 g/L. To load the catalyst, the honeycomb structure was dipped into the catalyst slurry for impregnation, followed by air-blowing to blow off the extra catalyst slurry. This was dried at the temperature of 120° C., followed by heat treatment at 500° C. for 3 hours, whereby a honeycomb structure loaded with the catalyst was obtained. The loading amount of the catalyst at the honeycomb structure of Example 1 was 150 g/L.

For the honeycomb structure of Example 1 loaded with the catalyst in this way, "temperature-rising test", "soot-clogging test", "catalyst peeling test" and "canning test" were conducted by the following method. Table 2 shows the result.

TABLE 2

| | Temp. rising test Result | Soot-clogging test Result | Catalyst peeling test Result | Canning test Result |
|---|---|---|---|---|
| Ex. 1 | OK | OK | OK | OK |
| Ex. 2 | OK | OK | OK | OK |
| Ex. 3 | OK | OK | OK | OK |
| Ex. 4 | OK | OK | OK | OK |
| Ex. 5 | OK | OK | OK | OK |
| Ex. 6 | OK | OK | OK | OK |
| Ex. 7 | OK | OK | OK | OK |
| Ex. 8 | OK | OK | OK | OK |
| Ex. 9 | OK | OK | OK | OK |
| Ex. 10 | OK | OK | OK | OK |
| Ex. 11 | OK | OK | OK | OK |
| Comp. Ex. 1 | NG | NG | OK | OK |
| Comp. Ex. 2 | OK | NG | OK | OK |
| Comp. Ex. 3 | OK | NG | OK | OK |
| Comp. Ex. 4 | OK | OK | NG | OK |
| Comp. Ex. 5 | OK | NG | NG | OK |
| Comp. Ex. 6 | OK | NG | NG | NG |
| Comp. Ex. 7 | OK | OK | OK | NG |

[Temperature-Rising Test]

Heating test of the honeycomb structure was conducted using a "propane gas burner tester" including a metal case to store the honeycomb structure and a propane gas burner configured to feed heated gas into the metal case. The heating gas was combustion gas generated by burning propane gas with the gas burner (propane gas burner). The temperature rising property was evaluated by checking the time required for the honeycomb structure to reach 450° C. in the above heating test. Specifically the obtained honeycomb structure was stored (canning) in the metal case of the propane gas burner tester. Then, gas (combustion gas) heated by the propane gas burner was supplied into the metal case so as to let the gas pass through the honeycomb structure. The temperature conditions (inlet gas temperature conditions) of the heating gas flowing into the metal case were as follows. First, the temperature was raised to 600° C. in 2 minutes and held at 600° C. for 10 minutes. Such a series of operations for raising and holding the temperature is called a "temperature-rising operation". After that, the time for the honeycomb structure to reach 450° C. was checked. In Table 2, the honeycomb structures having the time of 23 seconds or less are indicated as "OK", and the honeycomb structures having the time exceeding 23 seconds are indicated as "NG".

[Soot-Clogging Test]

Soot-clogging test for the honeycomb structure was conducted using a metal case to store the honeycomb structure and an engine or a soot-generator configured to feed heated gas into the metal case. Gas was passed through the honeycomb structure (dimensions: diameter 190.5 mm and total length 101.6 mm) for 3 hours under the conditions of gas temperature at 200° C. and flow rate of 1.5 Nm³/min, and then the surface of the cells of the honeycomb structure was observed with an optical microscope. If less than ½ of the area of the cells of the honeycomb structure was blocked with soot, the honeycomb structure was OK, and if more than ½ of the area of the cells was blocked with soot, the honeycomb structure was NG.

[Catalyst Peeling Test]

0.5 MPa factory air was sprayed to the honeycomb structure with an air gun. When the weight change between before and after the spraying was less than 5%, the honeycomb structure was OK. If the weight change was 5% or more, the honeycomb structure was NG.

[Canning Test]

Isostatic strength of the honeycomb structure was measured. The honeycomb structures having the isostatic strength of 1 MPa or more were OK, and the honeycomb structures having the isostatic strength less than 1 MPa were NG. The isostatic strength was measured in accordance with the isostatic fracture strength testing specified at M505-87 of the Japanese Automotive Standards Organization (JASO) that is a specification issued by the Society of Automotive Engineers of Japan. Isostatic fracture strength is tested by placing a honeycomb structure in a rubber-made tubular container, which is sealed with an aluminum plate, and then applying an isostatic pressure thereto in water. Isostatic strength measured by this isostatic fracture strength testing is indicated as a pressure (MPa) applied when the honeycomb structure breaks down.

Examples 2 to 11

Honeycomb structures of these examples were manufactured by changing the structure of the honeycomb structures as in Table 1. The porosity P and the average pore diameter D were adjusted with the amount and size of the pore former. The geometric surface area G was adjusted with the die. Examples 2 to 11 were changed as follows during the manufacturing.

In Example 2, the amount of the pore former added was 10 parts by mass, and the pore former had the average particle diameter of 5 µm. The amount of the pore former added indicates a ratio to 100 parts by mass of the cordierite forming raw material, and the same applies to the other examples.

Comparative Examples 1 to 7

Honeycomb structures of these comparative examples were manufactured by changing the structure of the honeycomb structures as in Table 1. Comparative Examples 1 to 7 were changed as follows during the manufacturing.

In Comparative Example 1, the amount of the pore former added was 5 parts by mass, and the pore former had the average particle diameter of 3 µm.

For the honeycomb structures of Examples 2 to 11 and Comparative Examples 1 to 7, "temperature-rising test", "soot-clogging test", "catalyst peeling test" and "canning test" were conducted. Table 2 shows the result.

(Result)

The honeycomb structures of Examples 1 to 11 had good results for all of the "temperature-rising test", "soot-clogging test", "catalyst peeling test" and "canning test". In contrast, the honeycomb structure of Comparative Example 1 had the value of Expression (1) of 0.13, resulting in that this honeycomb structure had poor temperature-rising property in the temperature-rising test. The honeycomb structures of Comparative Examples 1 to 3, 5 and 6 had the hydraulic diameter of the cells less than 1.1 mm, and the cells of these honeycomb structures were clogged with soot in the soot clogging test. The honeycomb structure of Comparative Example 4 had the value of Expression (2) of 7, and had catalyst peeling during the catalyst peeling test. The honeycomb structures of Comparative Examples 5 and 6 also had catalyst peeling during the catalyst peeling test. Presumably the catalyst peeling of the honeycomb structure of Comparative Example 5 was caused by the high cell density and the small hydraulic diameter. The honeycomb structure of Comparative Example 6 had the value of Expression (1) of 0.07, and also failed the canning test. The honeycomb structure of Comparative Example 7 had the value of Expression (2) of 57, and failed the canning test.

The honeycomb structure of the present invention can be used for a catalyst carrier to be loaded with catalyst to purify exhaust gas.

DESCRIPTION OF REFERENCE NUMERALS

1: Partition wall, 2: Cell, 3: Circumferential wall, 4: Honeycomb structure body, 11: First end face, 12: Second end face, 100: Honeycomb structure

What is claimed is:

1. A honeycomb structure comprising a pillar-shaped honeycomb structure body having a first end face and a second end face and comprising a porous partition wall disposed so as to surround a plurality of cells, the plurality of cells extending from the first end face to the second end face and serving as a through channel of fluid, wherein
let that A denotes an absolute value of open frontal area (%) in a plane of the honeycomb structure body orthogonal to the extending direction of the cells and P denotes an absolute value of porosity (%) of the partition wall, the honeycomb structure has a value represented by the following expression (1) that is 0.05 to 0.12,
let that D denotes an average pore diameter (µm) of the partition wall and G denotes a geometric surface area (mm$^2$/mm$^3$) of the partition wall, the honeycomb structure has a value represented by the following expression (2) that is 8 to 50 (µm×mm$^2$/mm$^3$), and
the honeycomb structure has a hydraulic diameter of the cells that is 1.1 mm or more, $(1-A/100) \times (1-P/100)$,   Expression (1)

$D \times G$.   Expression (2)

2. The honeycomb structure according to claim 1, wherein the partition wall comprises at least one type selected from the group consisting of cordierite, silicon carbide, silicon nitride, and mullite.

3. The honeycomb structure according to claim 1, wherein the partition wall has a surface roughness Ra of 1 µm or more.

4. The honeycomb structure according to claim 1, wherein the honeycomb structure is installed in an exhaust system of an internal combustion engine, and is placed upstream of an oxidation catalyst or an exhaust-gas purifying filter installed separately in the exhaust system.

5. The honeycomb structure according to claim 2, wherein the partition wall has a surface roughness Ra of 1 µm or more.

* * * * *